US011663300B2

(12) United States Patent
Walters et al.

(10) Patent No.: US 11,663,300 B2
(45) Date of Patent: May 30, 2023

(54) SYSTEMS AND METHODS FOR LOCALIZED FILE TRANSFER WITH FILE DEGRADATION

(71) Applicant: Capital One Services, LLC, McLean, VA (US)

(72) Inventors: Austin Walters, Savoy, IL (US); Reza Farivar, Champaign, IL (US); Galen Rafferty, Mahomet, IL (US); Anh Truong, Champaign, IL (US); Jeremy Edward Goodsitt, Champaign, IL (US); Vincent Pham, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 299 days.

(21) Appl. No.: 17/066,781

(22) Filed: Oct. 9, 2020

(65) Prior Publication Data

US 2022/0114239 A1 Apr. 14, 2022

(51) Int. Cl.
*G06F 21/12* (2013.01)
*G06F 11/10* (2006.01)
*H03M 7/30* (2006.01)

(52) U.S. Cl.
CPC ........ *G06F 21/125* (2013.01); *G06F 11/1004* (2013.01); *H03M 7/3059* (2013.01); *G06F 2221/0722* (2013.01); *G06F 2221/0751* (2013.01)

(58) Field of Classification Search
CPC ............... G06F 21/125; G06F 11/1004; G06F 2221/0722; G06F 2221/0751; G06F 11/1048; G06F 21/6209; H03M 7/3059
See application file for complete search history.

(56) References Cited

U.S. PATENT DOCUMENTS

| 8,270,811 | B2* | 9/2012 | Inokuchi | G11B 20/00826 386/232 |
| 8,751,329 | B2* | 6/2014 | Kemery | G06Q 30/0607 705/26.5 |
| 9,389,949 | B1* | 7/2016 | Campbell | G06F 11/1004 |
| 9,445,051 | B1* | 9/2016 | Muthsandra Kantharaju | H04L 65/1069 |
| 10,114,999 | B1* | 10/2018 | Burke | G06Q 30/0207 |
| 10,115,114 | B2* | 10/2018 | Dillon | G06Q 30/0225 |
| 11,516,506 | B2* | 11/2022 | Ling | H04N 19/11 |
| 2002/0107803 | A1* | 8/2002 | Lisanke | H04L 63/0428 705/51 |

(Continued)

*Primary Examiner* — David Garcia Cervetti
(74) *Attorney, Agent, or Firm* — Troutman Pepper Hamilton Sanders LLP; Christopher J. Forstner; John A. Morrissett

(57) ABSTRACT

Systems and methods for redeeming digital files are disclosed. In particular, the systems and methods relate to localized sharing of digital files such that the digital file is degraded when the file is redeemed. The digital file can include a plurality of bits, and bits of the digital file can be removed upon each transfer and/or access of the digital file. When a quantity of bits in the digital file falls below a predetermined threshold, the digital file can be deactivated. The systems can include an application that degrade the digital file. The degradation can include file compression, bitrate reduction, and/or removal of parity bits from the digital file. Security measures, such as private/public encryption keys, are also disclosed herein.

20 Claims, 9 Drawing Sheets

(56) References Cited

U.S. PATENT DOCUMENTS

| | | | |
|---|---|---|---|
| 2004/0015695 A1* | 1/2004 | de Queiroz | G06T 1/0042 713/176 |
| 2005/0063615 A1* | 3/2005 | Siegel | G06F 16/9535 707/E17.109 |
| 2006/0212435 A1* | 9/2006 | Williams | G06F 16/93 707/E17.022 |
| 2007/0033419 A1* | 2/2007 | Kocher | G11B 20/00086 713/193 |
| 2008/0092181 A1* | 4/2008 | Britt | H04N 21/482 348/E7.071 |
| 2008/0148363 A1* | 6/2008 | Gilder | G06F 21/10 726/28 |
| 2009/0268905 A1* | 10/2009 | Matsushima | G06F 21/10 726/30 |
| 2010/0329359 A1* | 12/2010 | Iyer | G11B 27/28 375/E7.076 |
| 2011/0047041 A1* | 2/2011 | Kemery | G06Q 30/0607 705/26.25 |
| 2012/0045052 A1* | 2/2012 | Vazquez | H04N 21/234327 380/201 |
| 2013/0091528 A1* | 4/2013 | Honda | H04N 21/6437 725/85 |
| 2013/0144981 A1* | 6/2013 | Koreeda | G06Q 50/184 709/219 |
| 2013/0198038 A1* | 8/2013 | Mowatt | G06Q 10/10 726/28 |
| 2014/0278872 A1* | 9/2014 | Shimizu | G06Q 30/0217 709/204 |
| 2015/0317662 A1* | 11/2015 | Dillon | G06Q 30/02 705/14.26 |
| 2016/0103652 A1* | 4/2016 | Kuniansky | H04L 63/123 700/94 |
| 2017/0147830 A1* | 5/2017 | Park | G06F 21/121 |
| 2017/0353525 A1* | 12/2017 | Choi | H04W 12/068 |
| 2018/0089708 A1* | 3/2018 | Greenberger | G06Q 30/0239 |
| 2019/0065803 A1* | 2/2019 | Burke | G06K 19/06028 |
| 2019/0188095 A1* | 6/2019 | Shen | G06F 11/2033 |
| 2021/0067816 A1* | 3/2021 | Gupta | H04N 21/4331 |
| 2021/0067817 A1* | 3/2021 | Gupta | H04N 21/4425 |
| 2022/0092110 A1* | 3/2022 | Vankipuram | H04N 21/4394 |
| 2022/0114239 A1* | 4/2022 | Walters | G06F 11/1004 |

* cited by examiner

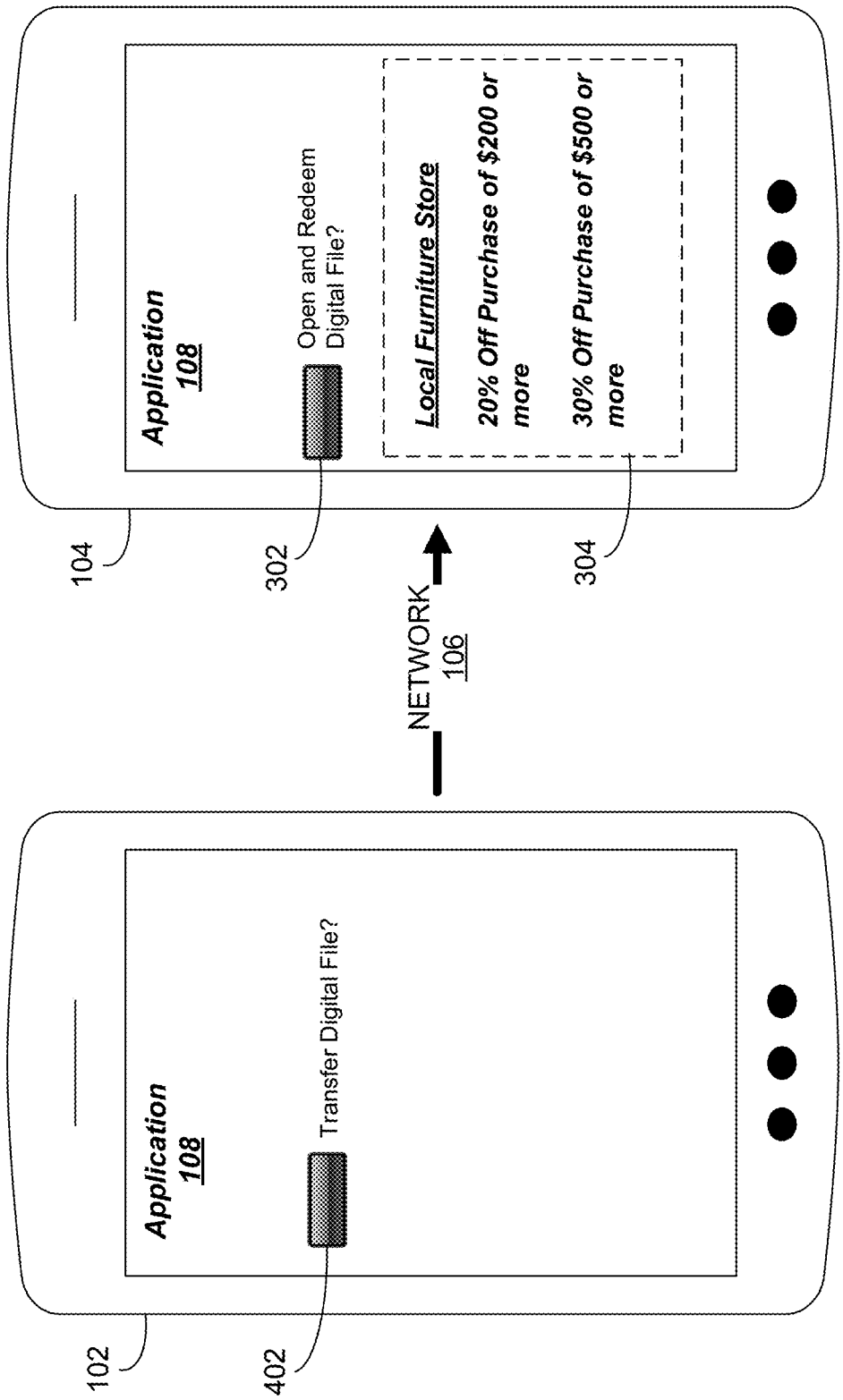

SYSTEMS AND METHODS FOR LOCALIZED FILE TRANSFER WITH FILE DEGRADATION

FIELD

Examples of the present disclosure relate generally to systems and methods for redeeming digital files and, more particularly, to systems and methods for localized sharing of digital files such that the digital file is degraded each time the file is redeemed.

BACKGROUND

Person-to-person, or more particularly device-to-device, digital file sharing is a common way for friends, customers and clients, businesses, and the like to interact with each other in the growing world of electronic commerce. Digital information such as images, audio files, and videos are instantaneously transmitted between user devices, enabling users to communicate a message like never before. One disadvantage of most file sharing platforms is, however, the ability to freely access and transfer files with little to no limitation on behalf of the file originator.

Consider for example a musician that creates a song and wants to transfer that song to a potential fan. Once that file is transferred to the potential fan, most systems and methods do nothing to prohibit that song from being transferred to another person or to thousands of people. The musician, therefore, is not able to capitalize on people enjoying his or her music, as that digital file was not protected from expansive propagation. Also consider a digital coupon for a merchant. The merchant may create a digital coupon for redeeming a free product or for discounts on products, and the merchant may wish to distribute that coupon, but only a limited number of times. Current systems and methods do not prevent unlimited propagation of the digital file, which means the digital coupon could cause more financial harm than it does advance the visibility or customer base of the merchant.

One reason for this disadvantage is the inherent copiability of digital files. Digital files can be accessed, copied, and transferred without any degradation of the file each time the file is redeemed (e.g., by accessing the file or transferring the file to another device). To this end, each version or use of the file is expected to be of the same quality as the prior version or use. What is needed, therefore, is a system and method that limits the number of transfers or accesses of the digital file by degrading the file, for example the binary code itself, each time the file is transferred or accessed. If the file is degraded to a point of un-usability, the merchant and musician described above, or any other digital file originator, can place restrictions on how widely the file can be spread or used.

BRIEF SUMMARY OF THE INVENTION

The present disclosure provides solutions to the above needs and other needs that will become apparent upon review of the Detailed Description and accompanying Drawings. Examples of the present disclosure relate generally to systems and methods for redeeming digital files and, more particularly, to systems and methods for localized sharing of digital files such that the digital file is degraded each time the file is redeemed.

The systems and methods described herein can include a system storing an application executed by one or more processors and a digital file. The digital file can be limited to a certain number of redemptions (i.e., accesses or transfers). The digital file can include a plurality of bits and can be unredeemable when a quantity of the plurality of bits falls below a predetermined threshold. The system can remove at least one of the plurality of bits each time the digital file is redeemed. The system can also send the digital file to one or more devices such that it is accessible via the application operating on the one or more devices.

Removing the at least one bit from the plurality of bits can be performed via a number of processes. For example, removal of the bit can include compressing the digital file, decreasing the bit rate of the file, and/or removing parity bits from the digital file. For compression, the predetermined threshold may be a minimum file size such that, if more data is removed from the digital file, the file is compressed to a point that it can no longer be viewed and/or heard by recipient devices. The system can also include a training step wherein the application populates fields to allow the creator/originator of the digital file to select which level of compression renders the file "deactivated" for the purposes of enjoying or using the file. In the case of removing parity bits, the application can append a quantity of parity bits to the digital file such that, once a threshold number of parity bits is removed, the digital file can no longer be accessed and/or transferred by the application.

Security measures may also be in place such that the digital file is only redeemable within the ecosystem of the application. For example, once an originator device uploads and/or creates the digital file, the application can create a private key that is transferable with the digital file. The digital file can be encrypted using the private key. The application can store a public key, which can be received upon downloading the application, that can be used to decrypt the digital file.

These and other aspects of the present disclosure are described in the Detailed Description below and the accompanying figures. Other aspects and features of examples of the present disclosure will become apparent to those of ordinary skill in the art upon reviewing the following description of specific, exemplary examples of the present invention in concert with the figures. While features of the present disclosure can be discussed relative to certain examples and figures, all examples of the present disclosure can include one or more of the features discussed herein. Further, while one or more examples can be discussed as having certain advantageous features, one or more of such features can also be used with the various examples of the invention discussed herein. In similar fashion, while exemplary examples can be discussed below as device, system, or method examples, it is to be understood that such exemplary examples can be implemented in various devices, systems, and methods of the present invention.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner. In the drawings:

FIGS. 4A and 4B depict an example user interface that can be used to transfer a digital file, according to the present disclosure;

DETAILED DESCRIPTION

Figure 1:
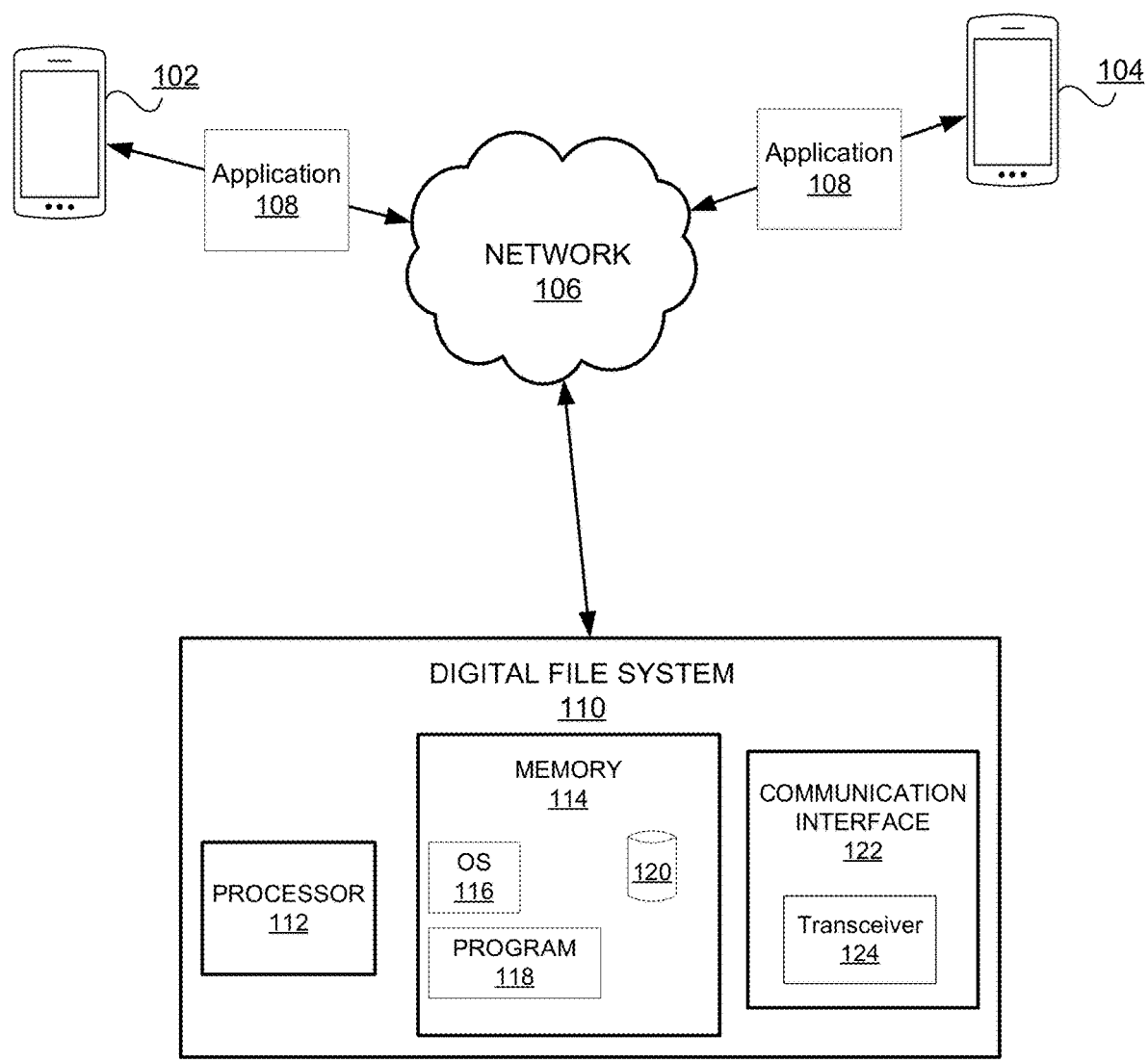
FIG. 1 is a diagram of an example system that can be used to implement one or more examples of the present disclosure.

Examples of the present disclosure include systems and methods for localized sharing of digital files such that the digital file is degraded each time the file is redeemed. Throughout this disclosure, it can be understood that "redeeming" a digital file can mean both accessing the digital file and transferring the digital file. To illustrate using an example, a digital coupon, which can be an image file, can be said to be redeemable 20 times. This can be understood to mean that a user device can both transfer the image file and/or access (i.e., retrieve and display the image file) a total of 20 times before the digital coupon is no longer redeemable. This same definition applies to other types of files, such as audio and video files. The limitations placed on the redemption of the digital file can provide a degree of control for the file creator or originator.

The systems described herein can include one or more components, which may or may not be a part of a single system or computing environment, that can create a digital file having a plurality of bits, which can be combined to create individual bytes, which can be combined to create the binary code that represents the digital file. This digital file can be accessed by the components of the system and transferred between components of the system. For example, individual user devices can create, access, and/or transfer the digital file to other user devices. In some examples, the user devices can include an application that facilitates the creation, access, or transfer of the digital file. For example, the application can include a graphical user interface (GUI) that enables an originator or creator device to upload the digital file or otherwise generate the digital file. The application can also be used to access (e.g., view or otherwise execute) the digital file. The application can also be stored on and executed by one or more recipient devices such that the recipient device can receive, access, and/or transfer the digital file to other recipient devices. The application running on the one or more devices can also perform the steps of file degradation such that the digital file is limited to a predetermined number of redemptions. File degradation can include the steps of removing data, for example bits of data.

In some examples, the systems and methods can be device-to-device oriented, meaning the storing and sharing of the digital file is localized, and a backend system may not be required to host the digital file or limit the access or transfer of the digital file. For example, the applications running on the one or more user devices can create, store (e.g., via communication with data storage on the user devices), and degrade the digital file (e.g., via communication with processors on the user devices), without requiring a backend system store, degrade, or track usage of the digital file. This can create a level of security for the digital file, because only transferor and transferee devices may be present to complete the processes. A backend system can also be present, however, to facilitate the redemptions. In some examples, the backend system (e.g., a digital file system) can host the application used by the user devices, such that devices can download the application to facilitate the file transfers. The backend system can also create encryption keys that can be associated with the application, and the keys can be used with encryption keys associated with the digital file to add additional layers of security.

Reference will now be made in detail to exemplary examples of the disclosed technology, examples of which are illustrated in the accompanying drawings and disclosed herein. Wherever convenient, the same reference numbers will be used throughout the drawings to refer to the same or like parts.

FIG. 1 is a diagram of an example system 100 that can be used to implement one or more examples of the present disclosure. A more detailed explanation of some of the components of the system 100 are described below. It may be beneficial, however, to provide a brief overview to describe the components of the systems and methods for creating and redeeming the digital files. The system 100 can include a first user device 102. The first user device 102 can be a device that creates, receives, accesses, and/or transfers the digital files described herein. For simplicity, the first user device 102 will be referred herein as the "creator," "originator," or initial user device that makes, uploads, or otherwise originates the original digital file, though first user device 102 is not so limited.

The system 100 can also include a second user device 104. The second user device 104 can be a device that creates, receives, accesses, and/or transfers the digital files described herein. For simplicity, the second user device 104 will be referred herein as a recipient user device that receives the digital file from the first user device 102, and the second user device 104 can access and/or transfer the digital file to another recipient user device. Though only two user devices 102, 104 are shown in system 100, it will be understood that more than two user devices can be used in the system, as the digital file may be transferred a plurality of times to a plurality of devices, depending on the parameters set by the creator device (i.e., first user device 102).

The first user device 102 and second user device 104 can communicate via a wired or wireless network 106. The network 106 can, therefore, facilitate the file transfers discussed herein. The wired networks can be an Ethernet network and the wireless networks can be cellular or WiFi™ networks, for example. In some examples, network 106 can connect terminals, services, and user devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted can be personal or confidential (e.g., it can include passwords), the connections can also be encrypted or otherwise secured. It is contemplated that the network 106 is more than one networks or more than one types of networks. For example, it is contemplated that the first user device 102 and second user device 104 can communicate with each other over one type of network (e.g., Bluetooth™, etc.), and the devices 102, 104 can communicate with a digital file system 110 over a different type of network (e.g., cellular network, etc.).

The first user device 102 and second user device 104 can communicate with each other via an application 108 operating on the devices. This application 108 can be downloaded and hosted by a digital file system 110. For example, the digital file system 110 can have memory (e.g., memory 114) that stores one or more programs (e.g., program 118) that are operable to create and host the application 108 that facilitates the digital file access and transfer. The digital file system 110 will be described in greater detail below.

Figure 2A:
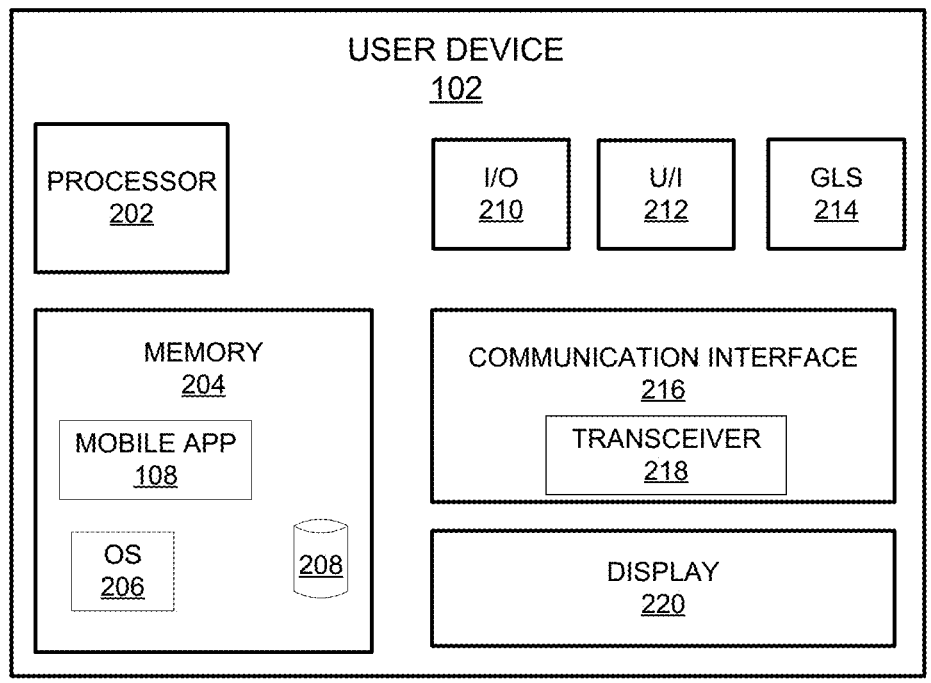
FIG. 2A is a component diagram of an example first user device that can be used to create, upload, and/or redeem a digital file, such as an image, video, or audio file, according to the present disclosure.

FIG. 2A is a component diagram of an example first user device 102 that can be used to create, upload, originate, and/or redeem a digital file, such as an image, video, or audio file, according to some examples of the present disclosure. Although only the first user device 102 is shown in FIG. 2A, the second user device 104 can be substantially similar to the first user device 102. The first user device 102 can be a mobile computing device (e.g., a smart phone, tablet computer, smart wearable (e.g., a smart watch), portable laptop computer, voice command device, wearable augmented reality device, or other mobile computing device) or a stationary device (e.g., desktop computer). The first user device 102 can include a processor 202 and a memory 204, operating system ("OS") 206, one or more programs (e.g., application 108 described above), and/or data storage 208. The first user device 102 can also include a communication interface 216 that includes a transceiver 218. The communication interface 216 and/or transceiver can be used to transmit the digital file to and receive the digital file from the one or more recipient devices.

The first user device 102 can also include one or more input/output ("I/O") devices 210 that can include one or more interfaces for receiving signals or input from devices and providing signals or output to one or more devices that allow data to be received and/or transmitted by the first user device 102. For example, the first user device 102 can include interface components, which can provide interfaces to one or more input devices, such as one or more keyboards, mouse devices, touch screens, track pads, trackballs, scroll wheels, digital cameras, microphones, sensors, and the like, that enable the first user device 102 to receive data from one or more users.

The first user device 102 can also include a user interface ("U/I") device 212 for receiving user input data, such as data representative of a click, a scroll, a tap, a press, or typing on an input device that can detect tactile inputs. According to some examples, U/I device 212 can include some or all of the components described with respect to I/O device 210 above. The U/I device 212 can be defined as the "input" of the first user device 102. The first user device 102 can also include a geographic location sensor ("GLS") 214 for determining the geographic location of first user device 102.

The first user device 102 can include a display 220. The display 220 can provide visual representation of the applications (e.g., application 108) and/or GUIs associated with those applications described herein. The display 220 can also be a U/I device 212 in the case that the first user device 102 has touchscreen capabilities. In other words, in some examples the display 220 can be the "input" of the first user device 102.

Figure 2B:
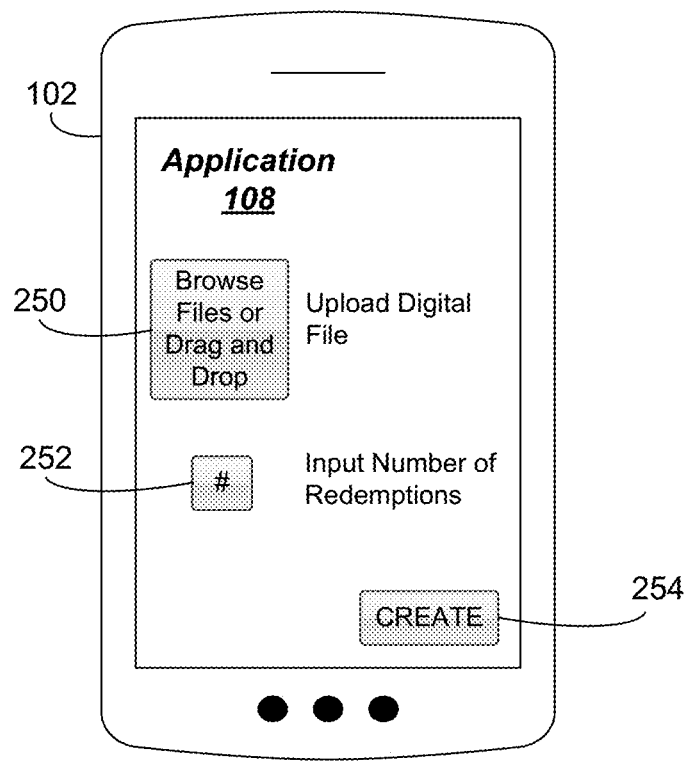
FIG. 2B is an example GUI that is operable to populate and display the application, according to the present disclosure.

As described above, the digital files referred to herein can be image files, video files, or audio files that can be created or uploaded by the first user device 102 (or second user device 104). Accordingly, the first user device 102 may populate a GUI that is capable of receiving the digital file from the creator and is also capable of receiving input on how many times the digital file may be accessed or transferred. FIG. 2B is an example GUI that is operable to populate and display the application 108. The application 108 can populate an upload section 250 that enables the user of the first user device 102 to select a digital file for redemption. For example, previously created digital coupon (e.g., an image) can be uploaded into the upload section 250 of the GUI created by the application 108. Once uploaded, the user may select, for example at a redemption quantity section 252, how many times that user wishes to allow that digital coupon to be accessed or transferred to other devices. For example, the user may select a quantity such as 20 (or any other quantity) in which that user device or any other recipient user device can either access or transfer the digital file. After selecting the file and the quantity of redemptions, the user may select that the file is ready to be populated, for example at a "create" radio button 254. Although reference is made here to a digital image file, like a coupon, any other file type can also be uploaded in this GUI or any other GUI provided by the application 108.

Figure 3B:
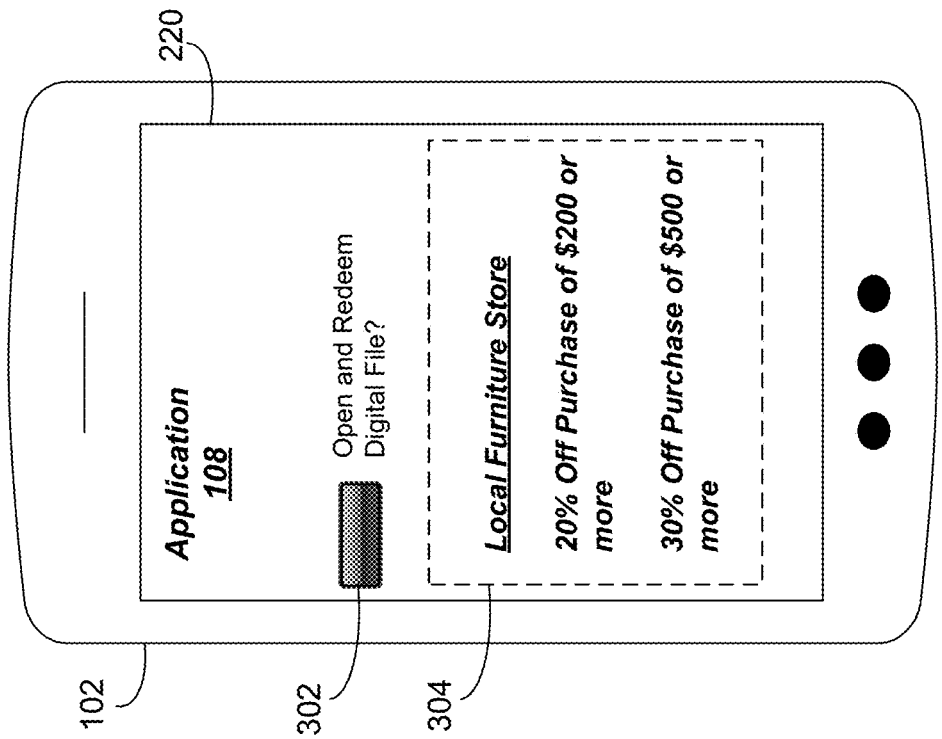
FIGS. 3A and 3B depict an example user interface, as provided by application for example, that can be used to access a digital file, according to the present disclosure.
Figure 3A:
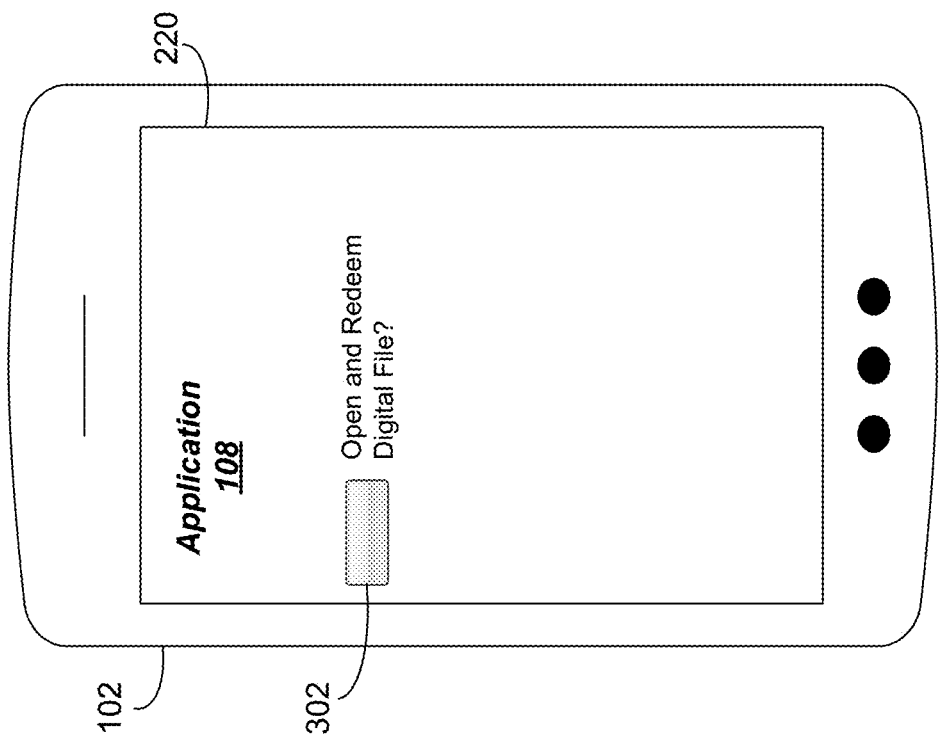

FIGS. 3A and 3B depict an example user interface, as provided by application 108 for example, that can be used to access a digital file, according to some examples of the present disclosure. As described above, "redeeming" a digital file or the "redemption" of a digital file can include accessing and/or transferring the digital file. Accessing the digital file can be understood to mean populating the digital file for execution. In the case of an image file or video, this can mean populating the digital file to be viewed on the display (e.g., display 220) of the first user device 102 or second user device 104. In the case of an audio file, this can mean populating the digital file for output on speakers, which can be associated with the input/output device 210 and the like.

FIG. 3A is a representation of a GUI associated with the application 108 that can ask a user if they wish to open (i.e., access) and redeem the digital file. This selection can be made at, for example, an access radio button 302. After selecting that the user wishes to access the digital file, the application 108 can populate the digital file. In FIG. 3B, the image file, as shown in this example, can then be populated in a field 304 associated with the digital file. This field 304 can also populate a video file, and in the case of an audio file only, the field 304 may not be present. It will be understood that the example interface shown for the application 108 is not limiting and is merely illustrative. Furthermore, although the examples shown in FIGS. 3A and 3B indicate the "accessing" of the digital file is performed by the first user device 102, it will be understood that the same process can apply to the second user device 104.

As described above, one benefit of the present system is that the digital file may be limited to a certain number of accesses and/or transfers, thereby limiting how wide-spread the file may be used or enjoyed. This can be accomplished by degrading the digital file each time the file is accessed, as shown in FIG. 3B. The degradation of the digital file can be accomplished in a number of ways. For example, certain bits of data can be removed from the digital file each time the file is accessed. This data removal can be performed, for example, by compressing the digital file, altering the bit rate of the digital file, and/or removing parity bits from the digital file such that the data in the file falls below a predetermined threshold after a certain number of accesses (or transfers, as described below). These types of degradations are described in greater detail below, for example with reference to FIGS. 5A and 5B.

FIGS. 4A and 4B depict an example user interface, as provided by application 108 for example, that can be used to transfer a digital file, according to some examples of the present disclosure. As described herein, transferring a digital file is another type of redemption that can cause a degradation of the digital file. FIG. 4A is a representation of a GUI associated with the application 108 that can ask a user if they wish to transfer the digital file to a different user (or user device). For example, the first user device 102 can select that they wish to transfer the file to another device, for example at a transfer radio button 402. The file can then be sent, for example via network 106, to a second user device, for example second user device 104. This transfer can cause a degradation of the digital file. At FIG. 4B, the second user device 104 can receive the file, and the user can then select to access the digital file, similar to the manner described above with reference to FIGS. 3A and 3B. It is contemplated that both the transfer (FIG. 4A) and the access (FIG. 4B) can both cause data (e.g., bits) from the original digital file to be removed.

Figure 5A:
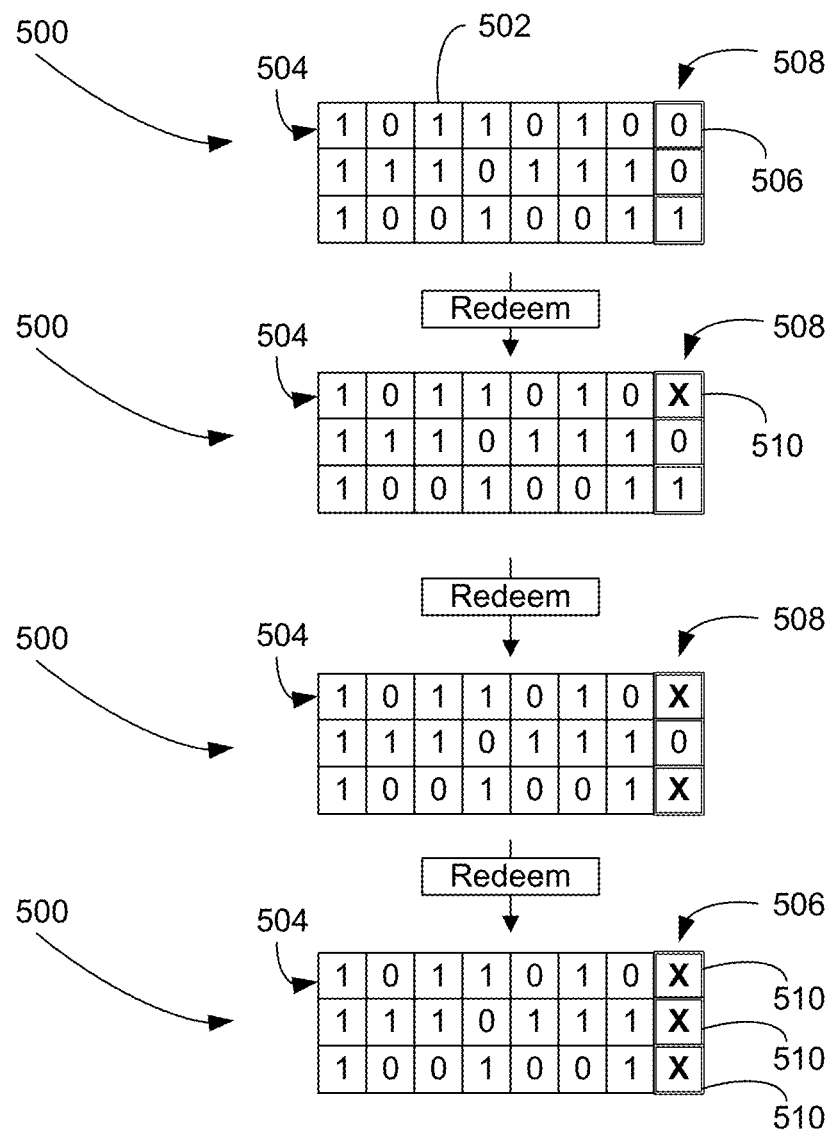
FIGS. 5A and 5B depict example processes for degrading a digital file upon accessing and/or transferring the digital file, according to the present disclosure.
Figure 5B:
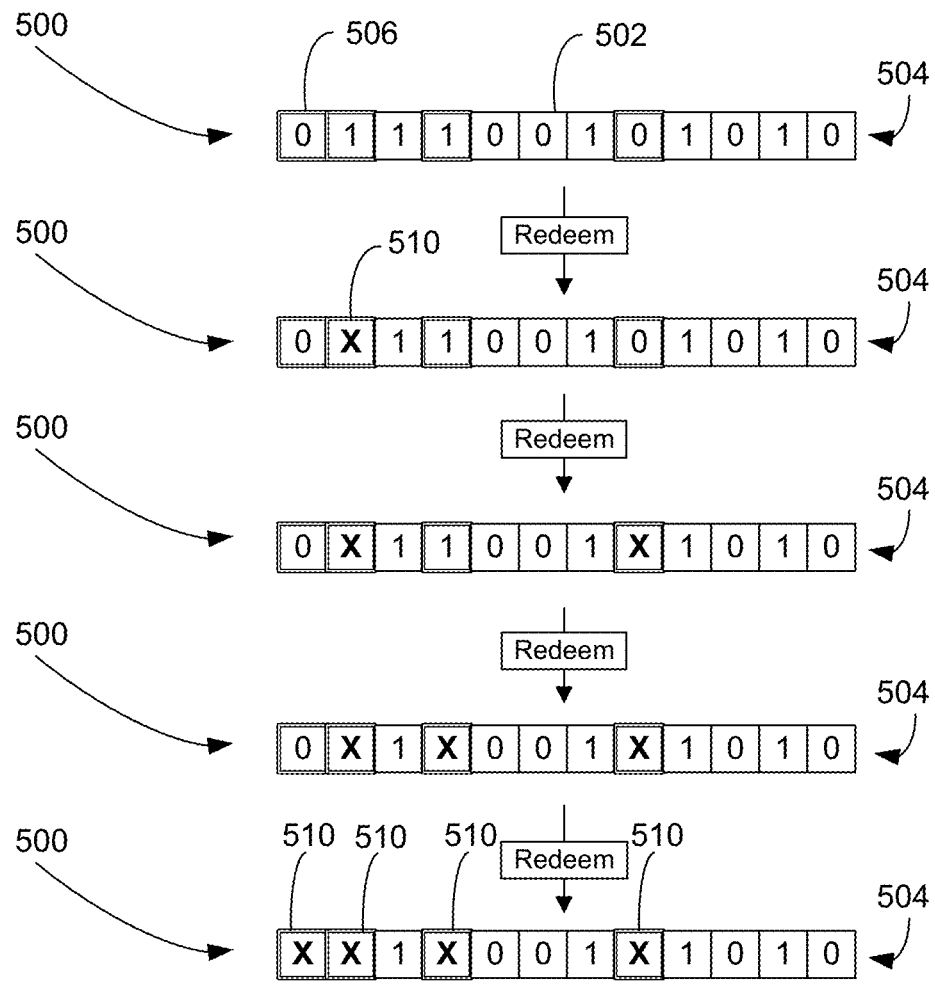

FIGS. 5A and 5B depict example processes for degrading a digital file upon accessing and/or transferring the digital file, according to some examples of the present disclosure. As described above, one way the systems described herein can degrade the file is to remove bits of data from the original file such that, after each access and/or transfer, the digital file comprises less data than before. FIGS. 5A and 5B depicts a method of removing parity bits from a digital file such that the file cannot be accessed by the application 108 after a predetermined quantity of parity bits have been removed from the binary code that represents the digital file. Parity bits are bits that are added to a string and that can be used to determine if a byte of data is missing a bit, or if a bit in that line of binary code has been altered. For example, a parity bit can be used to determine if the sum of bits are what is expected for the byte. An even parity can, for a plurality of bits, assess whether a sum of the bits whose value is "1" is an even number. If the sum of 1's is even, then the parity bit is "0," thereby not adjusting the sum of the string. If the count is odd, then the parity bit is "1," making the overall sum of the 1's an even number. The reverse is true for an odd parity, wherein the parity bit can be adjusted to make the entire string odd.

FIG. 5A depicts a digital file 500 having a plurality of bits 502 defining a single string 504 associated with the binary code of the digital file 500. For illustration and not limitation, the digital file includes three strings 504 of bits 502, and each string includes a single parity bit 506. As described above, the parity bit 506 can be used to determine if the file has been modified or is missing data in the string 504. In one example, each time a digital file is redeemed, a single parity bit 506 of the plurality of parity bits can be removed, for example via the application 108 operating on the user devices 102, 104. Once the predetermined number of parity bits 506 have been removed (e.g., as shown in the digital file 500 at the bottom of FIG. 5A), the file can be deactivated. This deactivation can include, for example, the inability of the application 108 to either access or transfer the digital file 500. FIGS. 5A and 5B depict removed parity bits 510 with an "X."

An example interface that includes a plurality of parity bits 506 can be beneficial for a number of reasons. For example, the deactivation threshold, or the point at which enough bits have been removed to deactivate the digital file 500, can be set by setting the quantity of parity bits 506. Considering FIG. 2A for illustration, when the user of the first user device 102 inputs the total number of redemptions (e.g., at redemption quantity section 252 of the example GUI), the system can create a digital file 500 that includes that many deletable/removable parity bits 506. For example, if the user wishes to have the digital file 500 accessed and/or transferred 100 times, the application 108 can facilitate appending 100 parity bits 506 to the digital file 500. In addition, the parity bits can be used to track how many redemptions have occurred and how many remain for the digital file 500. For example, the application 108 can analyze the digital file 500 to determine how many parity bits remain in a parity space 508 of the binary code and, thus, how many redemptions remain. This information can be disposed on the GUI such as the one shown in FIGS. 3A-4B.

Another aspect of the present systems and methods is the ability to encrypt the digital file 500 to both secure the file and to prevent redemption outside of the ecosystem provided by the application 108. This encryption can be facilitated by public/private key pairs associated with the digital file 500 and the application 108. Using FIG. 1 to illustrate, the digital file system 110 can store, e.g., in a database 120 associated with the digital file system 110, a public key that can be linked with the application 108. When a user device (e.g., first user device 102, second user device 104, or any other creator or recipient user device) downloads the application 108 from the digital file system 110 over the network 106, the application 108 can be downloaded along with the public key and stored on the user devices. When a first user device 102 creates an original digital file 500 (e.g., as shown in FIG. 2B), the application 108 can also encrypt the digital file 500 and create a private encryption key associated with the digital file 500. When the digital file 500 is transmitted to another recipient device, the application 108 can transmit the private key along with the encrypted digital file 500. The recipient user device can then access the encrypted digital file 500 by decrypting it with the private/public key pair. In this manner, the system can ensure that the digital file 500 can only be opened by a user device that is operating the application 108, which includes the public key. This can prevent transfers via short message service, email, and the like, and enable access only within the application 108 ecosystem. It is contemplated that some or all of the parity bits described herein can be placed within the encryption layer of the binary code of the digital file 500.

FIG. 5B is another embodiment using the removal of parity bits 506 to degrade the digital file 500 upon each redemption. This embodiment uses what is referred to as a Hamming code, which is a linear error-correcting code with more than one parity bit 506 placed within a line (or string 504) of binary code. Each parity bit 506 can detect the parity of a certain subsets of bits in the code. For example, in FIG. 5A, the string 504 includes four parity bits 506, each of which can check a different sequence of bits. The first parity bit (a "0" here) can check every other bit, the second parity bit (a "1" here) can check two bits and skip two bits, etc. In these systems, the parity bits 506 can be interspersed throughout the string 504. The effect, however, can be similar to the example described above for FIG. 5A, in that each time a user device accesses or transfers the digital file 500, one or more parity bits 506 can be removed. In the example sown in FIG. 5B, the file can be deactivated when the predetermined threshold of removed parity bits 510 is four. This deactivation threshold, however, can be less than the total number of parity bits 506 (e.g., once three bits are removed in FIG. 5B, etc.).

In addition to the examples described herein that include removing parity bits 506 to degrade or deactivate the file, another example degradation of the file can include compression of the digital file 500. Data compression is another type of method to remove data from a file. Compression can be useful for any type of file, including the image, video, and audio files described herein. Lossy compression, for example, can be used to irreversibly degrade the digital file 500 each time the file is redeemed. Consider, for example, an image file. If the image file is compressed to a certain degree, the image quality can be degraded so much that the image is too pixelated to interpret. This can be beneficial for images that include barcodes, data matrices, and the like. Compression can also be used on audio and video files, such that each redemption causes a degree of degradation to the file such that, at a certain point, the file is no longer of sufficient quality to be enjoyed. For example, the file cannot be enjoyed and/or understood by another recipient receiving the file or someone accessing the file over the predetermined quantity of times, i.e., the predetermined deactivation threshold.

The degradation of the digital files 500 via compression can be completed in a number of ways. In one example, the digital file 500 can decrease in quality by a certain amount each time the file is redeemed. For example, when a first user device 102 created the file, it can be at 100% quality. Depending on the number of times the user wishes to allow the file to be redeemed, the quality can decrease by a certain amount each time. Using an image that includes a data matrix as an example, if the user decides that the image should no longer be readable after four redemptions, the application 108 may opt to compress the digital file 500 by 15% each time the file is redeemed. This means that, after one redemption, the image quality is 85% of the original, after two redemptions 72.25%, after three redemptions 61.41%, and after four redemptions 52.20% of the original quality. The image file, for example, may no longer be readable after the quality decreases to below 50% the original quality. This means that, if the file is redeemed a fifth time, the image quality will be 44.37% and no longer usable as a coupon.

Similar compression techniques as described above for image files can be used with both video and audio files. For these files, additional steps may be used to smooth the digital file at locations where the application 108 removes random bits of data from the binary code. For example, at any location with the application 108 removes one or more bits for compression, the application 108 or system can apply a filter, such as a Gaussian filter, to the two or more bits of the plurality of bits that are adjacent the location of the removed and/or deleted bit.

It is contemplated that the embodiments of file degradation that include compression can also include a training step. For example, the originator device, or first user device 102, can receive, at an input/output interface (e.g., I/O device 210), input from a user setting the threshold level of compression. Using FIG. 2A and an audio file for illustration, the user may upload an audio file, like a song, in the upload section 250 of the GUI provided by the application 108. The GUI can then populate a screen that enables a user to listen to the audio file at different compression levels. The user may select, for example, that a compression of 65% renders the audio file degraded below a threshold for it to be comprehendible. If the user also chooses that the file should be transferred (and/or accessed) only 20 times, the application 108 can then calculate the number of times the file can be transferred (and/or accessed) before the file is below 35% its original quality. With this example, the compression can be set to 5% per transfer (and/or access), e.g., a 21st transfer would cause the file to be at a quality of 34.06% of the original file quality. Training techniques can also be completed for image files and audio files, where the first user device 102 indicates the bottom threshold in which the digital file 500 is operable.

Figure 6:
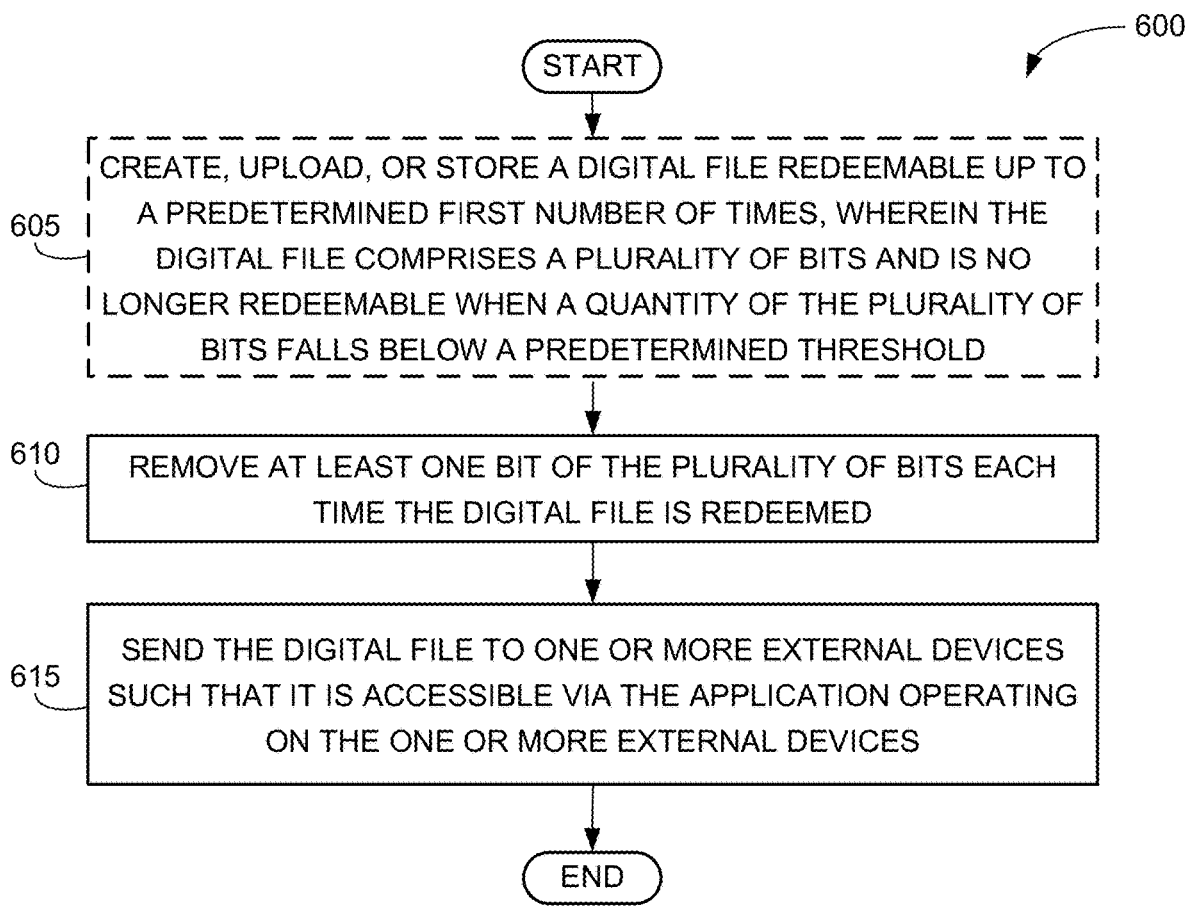
FIG. 6 is a flowchart depicting a process for degrading a digital file, according to the present disclosure.

FIG. 6 is a flowchart depicting a process 600 for degrading a digital file, according to some examples of the present disclosure. Process 600 can be performed by any of the user devices described herein, including the first user device 102 and second user device 104. For example, the system performing process 600 can include one or more processors (e.g., processor 202), an application (e.g., application 108), and memory (e.g., memory 204) that causes the processor and/or application to complete the process. Process 600 can begin at step 605, which includes creating, uploading, or storing a digital file redeemable up to a predetermined first number of times. The digital file can include a plurality of bits, and the file can be unredeemable after a quantity of the plurality of bits falls below a predetermined threshold.

This initial step 605 can be performed by a system that includes the creator device (i.e., the first user device 102). Creating or uploading the digital file can include the steps described above with reference to FIG. 2A. Creating the digital file can also include the steps of rendering the digital file. For example, the GUI associated with the application operating on the system can include sections or screens to generate a digital file. The GUI can provide templates for image files, for example, and the user can update the words and/or icons, photos, or symbols on the image file. Once created or uploaded, the one or more devices of the system can store the digital file. As described above, the original creator can indicate the predetermined number of times the file is redeemable (e.g., FIG. 2B). In other words, the system can receive an indication that the creator/originator wishes the file to be redeemable a maximum of the predetermined number of times. An application running on the system (e.g., application 108) can then receive and/or identify the file and calculate how many bits can be removed before the quantity of the plurality of bits falls below the predetermined threshold.

It should be noted that step 605 in FIG. 6 is dashed to emphasize that the digital file can already be stored on the system, as in the file is already created, uploaded, or originated. In these cases, process 600 can begin a step 610. At step 610, process 600 can include removing at least one bit of the plurality of bits each time the digital file is redeemed. Step 610 can be performed, for example, by an application on a sending user device. As described throughout this disclosure, redeeming the digital file can include transferring or accessing the digital file. The removal and/or deletion of at least one bit of the plurality of bits can be facilitated by the application in communication with the one or more processors. Removal of bits can include any of the processes described herein. For example, in some examples, the removal of the bits can be accomplished by compressing the digital file. In these cases, the predetermined threshold can be a threshold level of compression. In alternative examples, the removal of the bits can be accomplished by removing parity bits within the code of the digital file. In these cases, the digital file can be rendered unredeemable when a quantity of the parity bits in the digital file falls below the predetermined threshold.

At step 615, process 600 can include sending the digital file to one or more devices such that it is accessible via the application operating on the one or more devices. The sending device can be the initial device (e.g., first user device 102) or a subsequent, recipient device (e.g., second user device 102). Step 615 can correspond to the processes described above with reference to FIGS. 4A and 4B. Since step 615 is a sending step, this can be considered a transfer (or one redemption) of the digital file, and, therefore, step 615 can cause the system to remove the at least one bit of the plurality of bits. After step 615 is completed, the one or more devices (e.g., recipient devices other than the creator device, for example second user device 104 described above) can also perform the steps shown in step 610 and 615.

Process 600 can end after step 615. Alternatively, process 600 can include additional steps according to the examples described here. For example, process 600 can be repeated until the quantity of bits removed from the digital file reaches the predetermined threshold, which then deactivates and/or degrades the digital file such that it can no longer be redeemed. Additionally, in cases where the digital file is an audio or video file, process 600 can include, responsive to removing at least a first bit from the plurality of bits, applying a filter to two or more bits of the plurality of bits that are adjacent a location of the removed first bit. Alternatively or in addition, process 600 can include a training step that includes receiving, at an input/output interface (e.g., I/O device 210), input from a user setting the threshold level of compression that the user would like to define as a deactivated or substantially degraded file. In cases that include image files, compression can be implemented, for example, by using lossy compression that renders an image file increasingly more pixelated. The predetermined threshold, therefore, can be a minimum threshold quantity of pixels of the image file. The user can select the minimum threshold level in a training step, as described above.

Process 600 can also include additional steps for security and encryption. For example, process 600 can include downloading the application (e.g., application 108) from a backend system (e.g., digital file system 110). The application can include a public key that can be used to decrypt the digital file. In these cases, process 600 can include encrypting the digital file, creating a private encryption key associated with the digital file, the digital file being accessible using the private encryption key, and sending the private encryption key with the digital file to the one or more devices. The one or more devices that receive the encrypted digital file can decrypt the digital file using the private key received with the digital file and the public key associated with the application.

Figure 7:
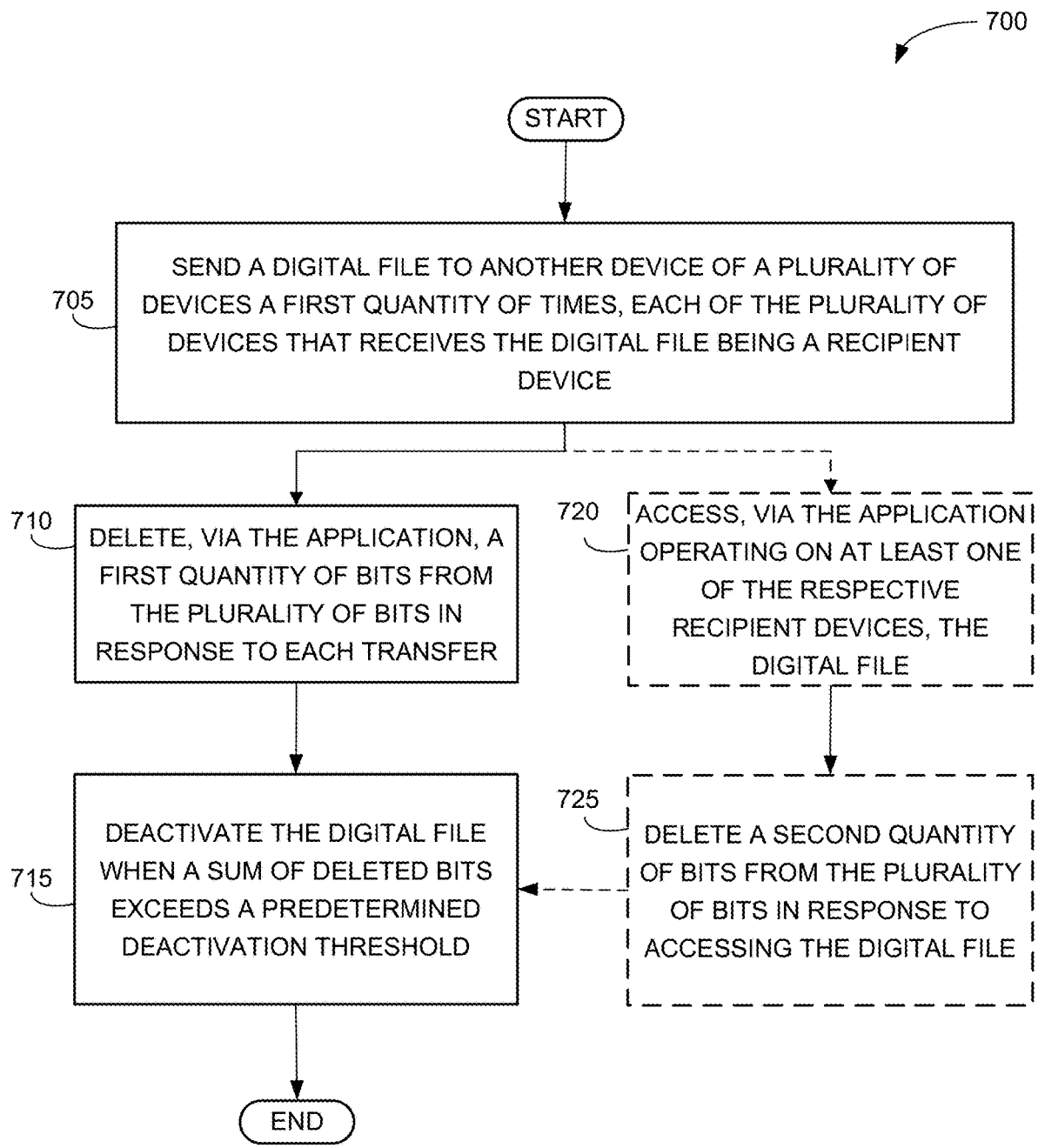
FIG. 7 is a flowchart depicting a process for degrading a digital file upon transfer, according to the present disclosure.

FIG. 7 is a flowchart depicting a process 700 for degrading a digital file upon transfer, according to some examples of the present disclosure. Process 700 can be performed by any of the user devices described herein, including the first user device 102 and second user device 104. For example, the system performing process 700 can include one or more processors (e.g., processor 202), an application (e.g., application 108), and memory (e.g., memory 204) that causes the processor and/or application to complete the process. The system can store a digital file transferable between and accessible by each of a plurality of devices. The digital file can include a plurality of bits. Process 700 can begin at step 705, which includes sending the digital file to another device of the plurality of devices a first quantity of times. Each of the plurality of devices that receives the digital file can be defined as a recipient device.

At step 710, process 700 can include deleting a first quantity of bits from the plurality of bits in response to sending the digital file. Deletion of the first quantity of bits can be completed, for example, by the application operating on the sending device or system or the receiving device or system. The application can delete the first quantity of bits according to the examples described herein. Removal and/or deletion of bits can include any of the processes described herein. For example, in some examples, the deletion of the bits can be accomplished by compressing the digital file. In alternative examples, the removal of the bits can be accomplished by removing parity bits within the code of the digital file.

At step 715, process 700 can include deactivating, via the application, the digital file when a sum of deleted bits exceeds a predetermined deactivation threshold. Deactivating the digital file can be accomplished by a number of processes. For example, in systems that track and remove parity bits from the digital file, the application can deactivate the digital file completely such that a recipient device is no longer able to access the digital file. In other examples, the digital files can be compressed to a point that they are either deactivated by the application or degraded to a point identified by the creator device. For example, the system can perform a training step, as described above, that informs the application the point at which the creator defines the digital file as "deactivated."

Process 700 can end after step 715. Alternatively, process 700 can include additional steps according to the examples described here. For example, process 700 can be repeated until the sum of deleted bits exceeds the predetermined deactivation threshold. Process 700 can also include additional steps that further degrade the digital file upon accessing the digital file. Steps 710 and 715, for example, defined a process to degrade the digital file upon transfer of the file. In some systems, transferring the digital file may be the only process that degrades the digital file. Consider for example digital files that include songs. The creator (which may be a musician) may wish for the song to be degraded upon transfer, thereby limiting how many recipient devices can receive the song. However, the creator may not wish for the song to be degraded each time it is played (i.e., accessed). In those cases, the file may only be degraded upon transfer. For other types of digital files, such as digital coupon image files, the creator may wish for the digital file to be degraded upon transfer and access. In these cases, process 700 can include step 720, which includes accessing, via the application operating on at least one of the respective recipient devices, the digital file. At step 725, process 700 can include deleting, via the application, a second quantity of bits from the plurality of bits in response to accessing the digital file.

The originator of the digital file can indicate the predetermined deactivation threshold (e.g., the example shown in FIG. 2B). In other words, process 700 can include the step of receiving an indication that the creator/uploader wishes the file to be redeemable a maximum number of times that corresponds to the predetermined deactivation threshold. An application running on the system (e.g., application 108) can then receive and/or identify the file and calculate how many bits can be removed before the sum of deleted bits exceeds the predetermined deactivation threshold.

Process 700 can also include additional steps for security and encryption. For example, process 700 can include downloading the application (e.g., application 108) from a backend system (e.g., digital file system 110). The application can include a public key that can be used to decrypt the digital file. In these cases, process 700 can include storing a public key usable by the plurality of devices to decrypt and access the digital file received from the creator device.

Figure 8:
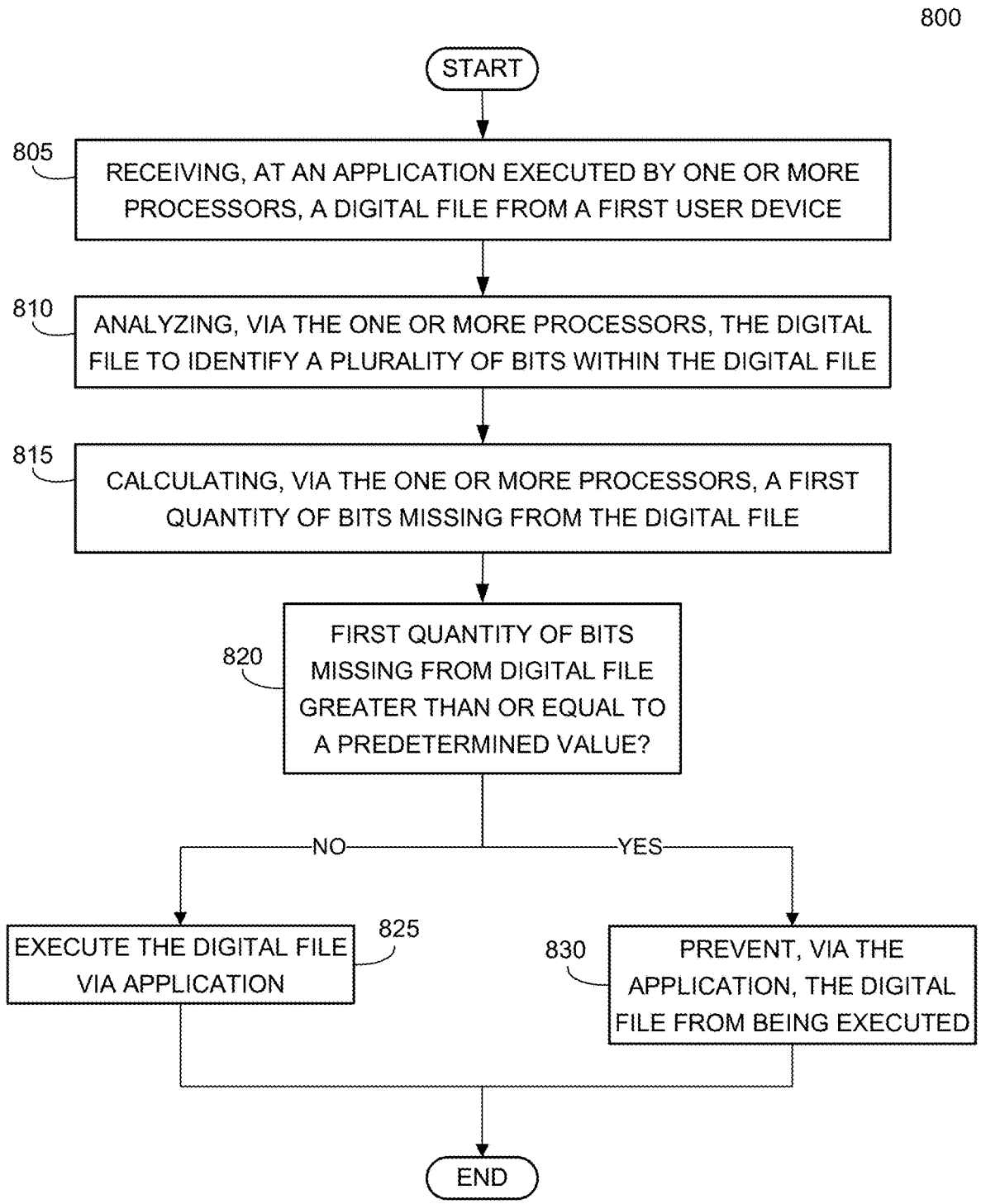
FIG. 8 is a flowchart depicting a method for receiving a digital file, according to the present disclosure.

FIG. 8 is a flowchart depicting a method 800 for receiving a digital file, according to some examples of the present disclosure. Method 800 can be performed by any of the user devices described herein, including the first user device 102 and second user device 104. For example, the system performing method 800 can include one or more processors (e.g., processor 202), an application (e.g., application 108), and memory (e.g., memory 204) that causes the processor and/or application to complete the process. Because method 800 describes the steps of receiving a digital file, it can be said that method 800 is performed by a recipient device (e.g., second user device 104). Method 800 can begin at step 805, which includes receiving a digital file from a user device (e.g., first user device 102). At step 810, method 800 includes analyzing the digital file to identify a plurality of bits within the digital file. This analysis can be performed by the application operating by the one or more processors. For example, the device can receive the digital file, access the code, and determine how many buts are within the code.

At step 815, method 800 can include calculating a first quantity of bits missing from the digital file. This calculation can be performed by the application operating by the one or more processors. The recipient device can read the file and determine how many bits are within the code. Using an example, if the digital file was created and/or uploaded with parameters to only allow the digital file to be accessed if a number of parity bits is greater than or equal to 20, the application at step 815 can read the file to determine if the file includes at least 20 parity bits. Using another example, if the digital file was created and/or uploaded with parameters to only allow the digital file to be accessed if the file is over, say, 50 kilobytes, the application at step 815 can read the file to determine if the file has been compressed to below 50 kilobytes.

After the application analyzes the file and calculates a first quantity of bits missing from the digital file, the application can either allow the recipient device to access the digital file or prohibit the recipient device from accessing the digital file. At step 820 the system determines whether the first quantity of bits missing from the digital file is greater than or equal to a predetermined value (e.g., the deactivation threshold inputted by the file originator). If the quantity of bits missing from the file are not equal to or greater than the predetermined value, method 800 can proceed to step 825 which includes executing the digital file via the application. Execution of the digital file can be accomplished as described above with reference to FIGS. 3A and 3B, wherein the digital file is accessed by the application. Alternatively, if the quantity of bits missing from the file are equal to or greater than the predetermined value, method 800 can proceed to step 830 which includes preventing, via the application, the digital file from being executed.

Method 800 can end after step 825 or step 830. Alternatively, method 800 can include additional steps according to the examples described here. For example, method 800 can include removing, with the one or more processors, at least one bit from the plurality of bits such that the digital file is degraded into a degraded digital file, and transferring, with a transceiver in communication with the one or more processors, the degraded digital file to a second device. Additionally, method 800 can include the security and encryption steps described herein. For example, method 800 can include receiving, at the application, a private key from the first user device concurrently with the digital file, the digital file being encrypted. The method can also include receiving, at the one or more processors, a public key from a backend system, the public key being associated with the application. The recipient device can receive the public key from a backend system (e.g., digital file system 110) upon downloading the application. Method 800 can also include decrypting, via the one or more processors, the digital file using the private key and the public key.

Referring again to the system 100 described in FIG. 1, the digital file system 110 can include one or more processors 112, a memory 114, and data storage, for example in database 120. The processor 112 can include one or more of a microprocessor, microcontroller, digital signal processor, co-processor or the like or combinations thereof capable of executing stored instructions and operating upon stored data.

The memory 114 of the digital file system 110 can include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data.

The memory 114 of the digital file system 110 can contain an operating system ("OS") 116 that can run one or more programs 118. The one or more programs 118 can perform one or more functions of the disclosed examples. The one or more programs 118 can include, for example, a program for creating the application 108 operable on the user devices (e.g., first user device 102 and second user device 104) and can create the public keys described herein that the user devices can use for decryption.

The memory 114 can also include any combination of one or more databases, including for example database 120, controlled by memory controller devices (e.g., server(s), etc.) or software, such as document management systems, Microsoft® SQL databases, SharePoint® databases, Oracle® databases, Sybase® databases, or other relational databases.

The digital file system 110 can include a communication interface 122 for communicating with external systems or internal systems. The communication interface 122 can include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof. The communication interface 122 can include a transceiver 124 to communicate with compatible devices. A transceiver 124 can be compatible with one or more of: radio-frequency identification (RFID), near-field communication (NFC), Bluetooth™, low-energy Bluetooth™ (BLE), WiFi™, ZigBee™, ambient backscatter communications (ABC) protocols, or similar technologies that enables the digital file system 110 to communicate via the network 106 described herein.

In some examples, the digital file system 110 can communicate with the one or more user devices operating the application 108 to track the number of times the digital file is redeemed by a device. For example, each device (e.g., first user device 102, second user device 104, and/or any other user device) can be in communication with the digital file system 110. Once a device redeems the digital file, a notification can be sent to the digital file system 110 such that the system is aware of how many times the digital file is redeemed and/or how many redemptions remain for the digital file. The first user device 102 can access the digital file system 110 to inquire about how many redemptions remain and, in other examples, the digital file system 110 can push notifications to the first user device 102 informing the originator how many redemptions remain.

Referring again to FIG. 2A, a component diagram of an example first user device 102, the processor 202 of the first user device 102 can be similar to the processor 112 of the digital file system 110. The memory 204 of the first user device 102 can be similar to the memory 114 of the digital file system 110. The OS 206 of the first user device 102 can be similar to the OS 116 of the digital file system 110. The data storage 208 of the first user device 102 can be similar to the data storage and/or database 120 of the digital file system 110. The communication interface 216 of the first user device 102 can be similar to the communication interface 122 of the digital file system 110. The transceiver 218 of the first user device 102 can be similar to the transceiver 124 of the digital file system 110. The memory 204 of the first user device 102 can be similar to the memory 114 of the digital file system 110. Second user device 104 can be substantially similar to first user device 102.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

The components described in this disclosure as making up various elements of the systems and methods are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Examples of the present disclosure can be implemented according to at least the following clauses:

Clause 1. A system comprising: one or more processors; an application executed by the one or more processors; a digital file redeemable up to a predetermined first number of times, wherein the digital file comprises a plurality of bits and is no longer redeemable when a quantity of the plurality of bits falls below a predetermined threshold; and memory in communication with the one or more processors and storing instructions that, when executed by the one or more processors, causes the system to: remove at least one bit of the plurality of bits each time the digital file is redeemed; and send the digital file to one or more devices such that it is accessible via the application operating on the one or more devices, wherein redeeming the digital file comprises at least one of accessing or sending the digital file.

Clause 2: The system of Clause 1, wherein: the digital file is an audio or video file; and the instructions are further configured to cause the system to, responsive to removing at least a first bit from the plurality of bits, apply a filter to two or more bits of the plurality of bits that are adjacent a location of the removed first bit.

Clause 3: The system of Clause 1 or 2, wherein: removing at least one bit from the plurality of bits comprises compressing the digital file; and the predetermined threshold is a threshold level of compression.

Clause 4: The system of Clause 3, further comprising an input/output interface, wherein the instructions are further configured to cause the system to receive, at the input/output interface, input from a user setting the threshold level of compression.

Clause 5: The system of Clause 3, wherein: the digital file is an image file; compressing the digital file comprises applying lossy compression to the image file; and the predetermined threshold is minimum threshold quantity of pixels of the image file.

Clause 6: The system of any of Clauses 1 to 5, wherein the plurality of bits comprises a plurality of parity bits, and the digital file is no longer redeemable when a quantity of the plurality of parity bits in the digital file falls below the predetermined threshold.

Clause 7: The system of any of Clauses 1 to 6, wherein the instructions are further configured to cause the system to: encrypt the digital file; create a private encryption key associated with the digital file, the digital file being accessible using the private encryption key; and send the private encryption key with the digital file to the one or more devices.

Clause 8: The system of any of Clauses 1 to 7, wherein: the plurality of bits comprise a plurality of parity bits, and the digital file is no longer redeemable when a quantity of the plurality of parity bits in the digital file falls below the predetermined threshold; and the plurality of parity bits are within an encryption layer of a code associated with the digital file.

Clause 9: The system of any of Clauses 1 to 8, wherein the instructions are further configured to cause the system to store, via the application, a public key usable by the system and the one or more devices to decrypt and access the digital file.

Clause 10: A system comprising: one or more processors; an application, operable on a plurality of devices, and executed by the one or more processors; a digital file transferable between and accessible by each of the plurality of devices, the digital file comprising a plurality of bits; and memory in communication with the one or more processors and storing instructions that, when executed by the one or more processors, causes the system to: send, via the application, the digital file to another device of the plurality of devices a first quantity of times, each of the plurality of devices that receives the digital file being a recipient device; delete, via the application, a first quantity of bits from the plurality of bits in response to sending the digital file; and deactivate, via the application, the digital file when a sum of deleted bits exceeds a predetermined deactivation threshold.

Clause 11: The system of Clause 10, wherein the instructions are further configured to cause the system to: access, via the application operating on at least one of the respective recipient devices, the digital file; and delete, via the application, a second quantity of bits from the plurality of bits in response to accessing the digital file, wherein the sum of deleted bits is a sum of the first quantity of bits and the second quantity of bits deleted from the plurality of bits.

Clause 12: The system of Clause 10 or 11, wherein deleting the first quantity of bits from the plurality of bits comprises compressing the digital file by a predetermined percentage of an original file size for the digital file.

Clause 13: The system of Clause 12, wherein: the plurality of bits comprises a plurality of parity bits; deleting the first quantity of bits comprises removing at least a first parity bit of the plurality of parity bits; and the predetermined deactivation threshold comprises a total quantity of parity bits removable before the digital file is no longer transferable or accessible.

Clause 14: The system of any of Clauses 10 to 13, wherein the instructions are further configured to cause the system to: encrypt, via the application, the digital file prior to transferring or accessing the digital file; and generate, via the application, a private encryption key associated with the digital file, wherein the digital file is accessible using the private encryption key.

Clause 15: The system of Clause 14, wherein: the plurality of bits comprises a plurality of parity bits; and the plurality of parity bits are within an encryption layer of a code associated with the digital file.

Clause 16: The system of Clause 14, the instructions are further configured to cause the system to store a public key usable by the plurality of devices to decrypt and access the digital file.

Clause 17: A method comprising: receiving, at an application executed by one or more processors, a digital file from a first user device; analyzing, via the one or more processors, the digital file to identify a plurality of bits within the digital file; calculating, via the one or more processors, a first quantity of bits missing from the digital file; and either: (1) executing, via an input/output interface, the digital file responsive to determining that a value of the first quantity of bits missing from the digital file is less than a predetermined value; or (2) preventing, via the application, the digital file from being executed when the value of the first quantity of bits missing from the digital file is equal to or greater than the predetermined value.

Clause 18: The method of Clause 17, further comprising: removing, with the one or more processors, at least one bit from the plurality of bits such that the digital file is degraded into a degraded digital file; and transferring, with a transceiver in communication with the one or more processors, the degraded digital file to a second device.

Clause 19: The method of Clause 18, wherein removing at least one bit from the plurality of bits comprises removing a parity bit from the plurality of bits.

Clause 20: The method of any of Clauses 17 to 19, further comprising: receiving, at the application, a private key from the first user device concurrently with the digital file, the digital file being encrypted; receiving, at the one or more processors, a public key from a backend system, the public key being associated with the application; and decrypting, via the one or more processors, the digital file using the private key and the public key.

Exemplary Use Cases

The following exemplary use cases describe examples of a typical user flow pattern. They are intended solely for explanatory purposes and not limitation.

John, a manager at a local furniture store, wishes to increase his customer base and therefore decides to create a digital coupon for percentages off total purchase. He creates a digital image file for 20% off a purchase of $200 or more, or 30% off purchase of $500 or more. He downloads an application from a digital file system, and uploads the coupon into the application interface. He also indicates that he does not want the coupon transferred more than five times, or else the coupon may cause more of a loss of revenue than a gain of new customers. The application accepts the digital coupon, and stores it on John's device. The application also appends five parity bits to the code associated with the image file. These parity bits are to be removed by the application each time the file is transferred.

John then sends the coupon to Steve, a potential customer who walked into the furniture store. In some examples, the application may not count the first or any subsequent transfer from John, the creator, as a "redemption," but only count any subsequent transfers (i.e., from customer to customer, or recipient to recipient). Steve receives the coupon, accesses it on the application operating on his user device, and presents it to John to save money on a furniture purchase.

Steve, impressed with his savings, sends the coupon to three of his friends. The application operating on Steve's device removes three parity bits prior to sending the coupon, one for each transfer. The three friends, therefore, receive the digital coupon with only two parity bits intact. Bob, one of the three friends, decides he is not in the market for new furniture, so he attempts to send the coupon to his three children. The application operating on Bob's device, however, prevents him from making the transfer, since only two parity bits remain, and informs Bob that only two transfers remain. Bob updates his request and sends the coupon to two children. The application operating on Bob's device removes two parity bits (one for each transfer) and sends the coupon. At this point, the coupon can no longer be transferred between user devices, as all parity bits have been removed from the digital file. This first example highlight advantages of the present systems and methods. Unlike prior systems, the digital image file, or coupon here, is protected from unlimited transfers.

In another example, John, the manager, decides that he prefers that the digital coupon is only transferable or accessible five times. This can prevent one customer from hoarding the coupon and using it multiple times with the same user device. John transfers the coupon to Steve, who then accesses the coupon to make the purchase. This access of the coupon removes one bit from the plurality of parity bits, meaning the digital file only contains four parity bits. Steve, impressed with his savings, sends the coupon to three of his friends. The application operating on Steve's device removes three parity bits prior to sending the coupon, one for each transfer. At this point, the three friends receive a digital file with only a single parity bit remaining. Ann, one of the three friends, accesses the digital file to make a purchase at the furniture store. This access removes the final parity bit of the five parity bits, thereby rendering the digital coupon deactivated. In some examples, the application running on Ann's device can send a notification to a digital file system that indicates that the file is deactivated, and the digital file system can send notifications to the other friends' phones deactivating the file such that it cannot be accessed or transferred. This second example highlights additional advantages of the present systems and methods. Not only do the systems provide options to prevent unauthorized transfer of the digital files, they also provide a means to prevent unauthorized overuse of the digital file. Prior art systems for file transfer, such as SMS, email, social media, and the like, did not place restrictions on the ability of user devices to execute the digital file once received.

In another example, Maria, a musician, wishes to upload her newest music video into an application as described herein. After selecting the file for upload, the application asks her how many times she would like the file transferred between user devices. She knows that she would like the extra visibility that comes with person-to-person transfers of music videos, but she also wants to capitalize on the video if it well received, for example by publishing the video on a website that enables revenue based on advertising. To this end, Maria selects to allow the video to be transferred 100 times between recipient devices. She is prompted, by the application, to play her video at varying levels of compression. Once the video is compressed to 40% the original quality, Maria indicates that the music video is overly pixelated, and the sound is overly distorted, such that it would render the music video beyond a point of viewability. The application then calculates a compression rate per transfer that renders the file compressed to 40% the original quality after 100 transfers.

Maria then sends the music video to fans. The fans can receive and view the music video on the application running on their user devices. As the fans begin to share the music video, the file is degraded upon each transfer. After 100 transfers, the digital file is below 40% the original quality, as specified by Maria.

In the case of Maria above, in some examples the application can append a private key to the music video before it is transferred. Once the fans receive the file, they can only play the music video in the ecosystem of the application. This is because the application stores a public key that is used to decrypt the music video. This can prevent one of the fans from uploading the music video to a streaming service to bypass Maria's intent to limit the transferability of the music video to 100 transfers. Prior systems, such as user devices operating streaming applications, did not provide options to limit the transferability without the use of some third-party service, like a streaming service. For example, a website may limit the number of plays of a single video, but that is controlled only at the backend. With the present systems and methods, the limitations on the file sharing and execution are localized, meaning the file degradation, compression, parity bit removal, etc. can take place on user devices. The system does not require a backend to track usage, thereby improving the security, and privacy, of the system.

What is claimed is:

1. A system comprising:
one or more processors;
an application executed by the one or more processors;
a digital file redeemable up to a predetermined first number of times, wherein the digital file comprises a plurality of bits and is no longer redeemable when a quantity of the plurality of bits falls below a predetermined threshold based on the predetermined first number of times; and
memory in communication with the one or more processors and storing instructions that, when executed by the one or more processors, causes the system to:
remove at least one bit of the plurality of bits each time the digital file is redeemed; and
send the digital file to one or more devices such that it is accessible via the application,
wherein redeeming the digital file comprises at least one of accessing or sending the digital file.

2. The system of claim 1, wherein:
the at least one bit is a first bit;
the digital file is an audio or video file; and
the instructions are further configured to cause the system to, responsive to removing the first bit, apply a filter to two or more bits of the plurality of bits that are adjacent a location of the removed first bit.

3. The system of claim 1, wherein:
removing at least one bit from the plurality of bits comprises compressing the digital file; and
the predetermined threshold is a threshold level of compression.

4. The system of claim 3, further comprising an input/output interface,
wherein the instructions are further configured to cause the system to receive, at the input/output interface, input from a user setting the threshold level of compression.

5. The system of claim 3, wherein:
the digital file is an image file;
compressing the digital file comprises applying lossy compression to the image file; and
the predetermined threshold is minimum threshold quantity of pixels of the image file.

6. The system of claim 1, wherein the plurality of bits comprises a plurality of parity bits, and the digital file is no longer redeemable when a quantity of the plurality of parity bits in the digital file falls below the predetermined threshold.

7. The system of claim 1, wherein the instructions are further configured to cause the system to:
encrypt the digital file;
create a private encryption key associated with the digital file, the digital file being accessible using the private encryption key; and
send the private encryption key with the digital file to the one or more devices.

8. The system of claim 7, wherein:
the plurality of bits comprise a plurality of parity bits, and the digital file is no longer redeemable when a quantity of the plurality of parity bits in the digital file falls below the predetermined threshold; and
the plurality of parity bits are within an encryption layer of a code associated with the digital file.

9. The system of claim 7, wherein the instructions are further configured to cause the system to store, via the application, a public key usable by the system and the one or more devices to decrypt and access the digital file.

10. A system comprising:
one or more processors;
an application, operable on a plurality of devices, and executed by the one or more processors;
a digital file transferable between and accessible by each of the plurality of devices, the digital file comprising a plurality of bits; and
memory in communication with the one or more processors and storing instructions that, when executed by the one or more processors, causes the system to:
send, via the application, the digital file to another device of the plurality of devices a first quantity of times, each of the plurality of devices that receives the digital file being a recipient device;
delete, via the application, a first quantity of bits from the plurality of bits in response to sending the digital file; and
deactivate, via the application, the digital file when a sum of deleted bits exceeds a predetermined deactivation threshold that is based on the first quantity of times.

11. The system of claim 10, wherein the instructions are further configured to cause the system to:
access, via the application operating on at least one respective recipient device of the plurality of devices, the digital file; and delete, via the application, a second quantity of bits from the plurality of bits in response to accessing the digital file,
wherein the sum of deleted bits is a sum of the first quantity of bits and the second quantity of bits deleted from the plurality of bits.

12. The system of claim 10, wherein deleting the first quantity of bits from the plurality of bits comprises compressing the digital file by a predetermined percentage of an original file size for the digital file.

13. The system of claim 12, wherein:
the plurality of bits comprises a plurality of parity bits;
deleting the first quantity of bits comprises removing at least a first parity bit of the plurality of parity bits; and
the predetermined deactivation threshold comprises a total quantity of parity bits removable before the digital file is no longer transferable or accessible.

14. The system of claim 10, wherein the instructions are further configured to cause the system to:
encrypt, via the application, the digital file prior to transferring or accessing the digital file; and
generate, via the application, a private encryption key associated with the digital file,
wherein the digital file is accessible using the private encryption key.

15. The system of claim 14, wherein:
the plurality of bits comprises a plurality of parity bits; and
the plurality of parity bits are within an encryption layer of a code associated with the digital file.

16. The system of claim 14, the instructions are further configured to cause the system to store a public key usable by the plurality of devices to decrypt and access the digital file.

17. A method comprising:
receiving, at an application executed by one or more processors of a first user device, a digital file from a second user device;
analyzing, via the one or more processors, the digital file to identify a plurality of bits within the digital file;
calculating, via the one or more processors, a first quantity of bits missing from the digital file; and
either:
executing, via an input/output interface, the digital file responsive to determining that a value of the first quantity of bits missing from the digital file is less than a predetermined value;
or
preventing, via the application, the digital file from being executed when the value of the first quantity of bits missing from the digital file is equal to or greater than the predetermined value.

18. The method of claim 17, further comprising:
removing, with the one or more processors, at least one bit from the plurality of bits such that the digital file is degraded into a degraded digital file; and
transferring, with a transceiver in communication with the one or more processors, the degraded digital file to a third device.

19. The method of claim 18, wherein removing at least one bit from the plurality of bits comprises removing a parity bit from the plurality of bits.

20. The method of claim 17, further comprising:
receiving, at the application, a private key from the second user device concurrently with the digital file, the digital file being encrypted;
receiving, at the one or more processors, a public key from a backend system, the public key being associated with the application; and
decrypting, via the one or more processors, the digital file using the private key and the public key.

* * * * *